United States Patent [19]
Kurke et al.

[11] 3,863,992
[45] Feb. 4, 1975

[54] INVERTING LIMITING RELAY VALVE WITH INTERLOCK

[75] Inventors: Edward J. Kurke; Roy E. Bartholomew, both of Elyria, Ohio

[73] Assignee: The Bendix Corporation, South Bend, Ind.

[22] Filed: May 10, 1974

[21] Appl. No.: 468,835

[52] U.S. Cl. .................. 303/9, 303/6 R, 303/13, 303/68, 303/71
[51] Int. Cl. .................. B60t 13/14, B60t 15/12
[58] Field of Search .......... 303/13, 9, 7, 71, 50, 54, 303/68, 59, 48, 52, 6 R, 52 X; 188/3, 170, 152

[56] References Cited
UNITED STATES PATENTS

| 3,228,729 | 1/1966 | Schubert | 303/9 |
| 3,294,455 | 12/1966 | Valentine | 303/9 |
| 3,480,334 | 11/1969 | Cruse | 303/52 X |
| 3,504,946 | 4/1970 | Valentine et al. | 303/9 |
| 3,504,947 | 4/1970 | Valentine | 303/9 X |
| 3,617,097 | 11/1971 | Grabb | 303/52 X |
| 3,746,401 | 7/1973 | Stearns | 303/9 X |

*Primary Examiner*—Trygve M. Blix
*Assistant Examiner*—D. C. Butler
*Attorney, Agent, or Firm*—Ken C. Decker; William N. Antonis

[57] ABSTRACT

For use in a fluid pressure braking system of the dual circuit type in which one circuit includes a spring applied fluid pressure released actuator, a valve device for controlling the actuator including a first valve member operable to supply fluid pressure from a source to the actuator to move the latter to a brake released position and effective to cut off such supply when the actuator has been released, and being operative to release fluid pressure from the actuator to graduate spring brake application thereof in accordance with fluid pressure supplied the other circuit, the valve device including a second valve member controlled by fluid pressure from said source for preventing operation of the first valve member so long as the fluid pressure is above a predetermined value.

3 Claims, 1 Drawing Figure

PATENTED FEB 4 1975　　　　　　　　　　　　　3,863,992
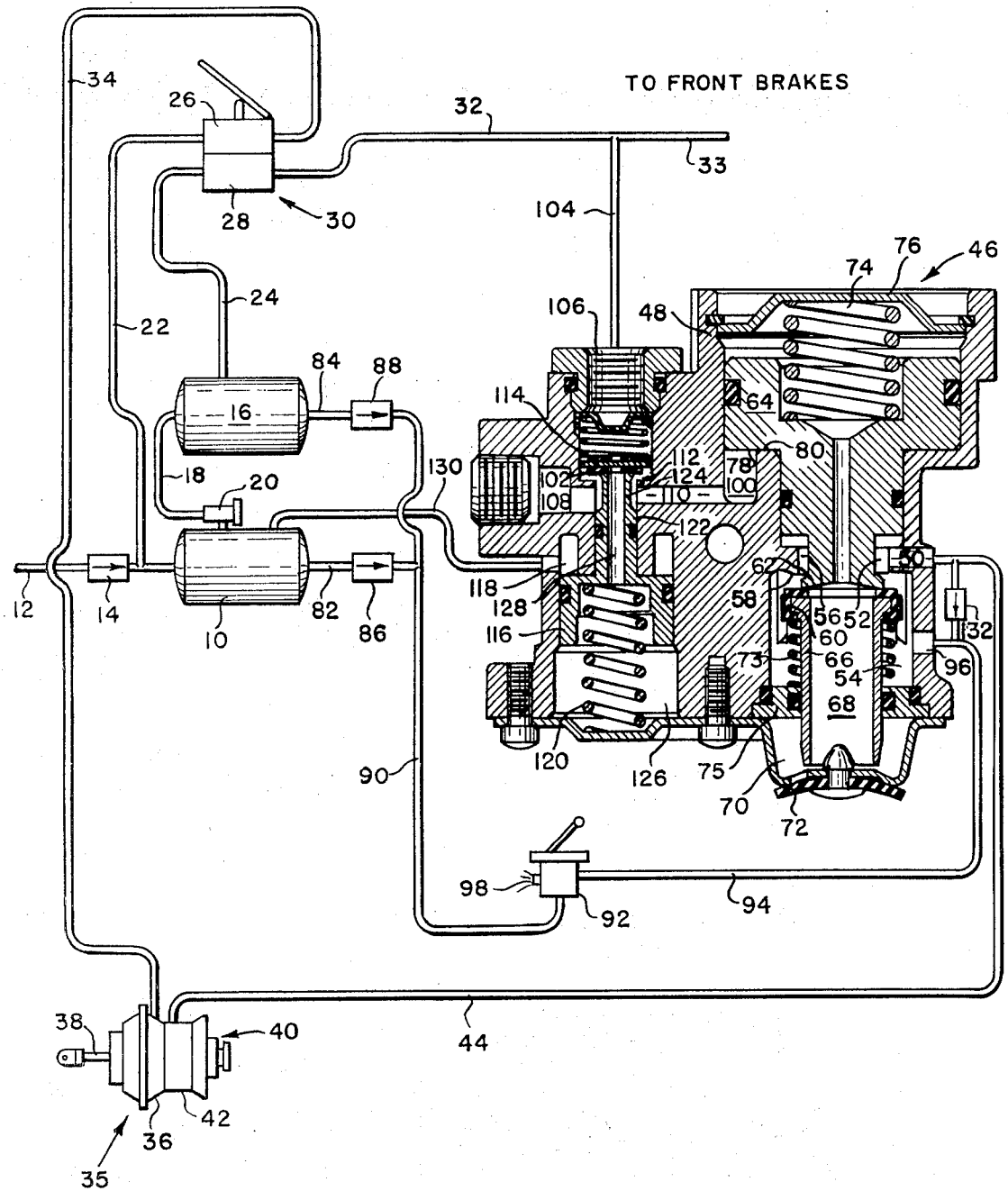

3,863,992

INVERTING LIMITING RELAY VALVE WITH INTERLOCK

This invention relates to valves for use in vehicle fluid pressure braking systems of the dual circuit type and more particularly to a valve for controlling spring applied fluid pressure released emergency brakes.

Spring applied fluid pressure released brakes are well known and in the conventional tandem actuator comprise a fluid pressure actuator for service application of the brakes together with a spring actuaor which is normally maintained in a brake released position by fluid pressure bar which is spring actuated, upon release of the fluid pressure, toi apply the brakes through the service actuator. In some installations, automatic valve means are provided to release the fluid pressure when the service or emergency pressure falls to an unsafe low level, thus assuring a spring brake emergency application. In order to prevent to application of the spring brakes toi their fullest extent, it has been proposed to gradually release the pressure from the release chamber of the spring brake and the broad object of the present invention is to provide for use in a dual circuit brake system, a novel valve means which will automatically, upon a decrease in fluid pressure from the source to a predetermined low level, graduate or release the pressure from the spring brakes at a controlled rate so that a vehicle may be brought to a gradual stop.

Another object of the present invention is to provide in a dual circuit fluid pressure braking system of the foregoing character, a novel valve device for controlling spring brake application in one circuit in accordance with the degree of brake application in the other circuit.

A further object is to provide a valve device of the above type which is so constructed that release of fluid pressure from the spring actuator is prevented until the pressure from the source drops to a predetermined low level.

Still another object is to provide a novel modulating relay valve of the above character which is positive in action, reliable in operation and includes relatively few parts which may be economically manufactured and assembled.

In the drawing, the single FIGURE diagrammatically illustrates a dual circuit fluid pressure braking system in connection with the novel modulating relay valve of the invention, the latter being shown in section.

Referring now to the drawing, the dual pressure braking system includes a primary reservoir 10 adapted to be supplied through a conduit 12 and one-way check valve 14 with compressed air from a conventional compressor (not shown), the reservoir 10 supplying fluid pressure to a secondary reservoir 16 by way of a conduit 18 and air from a conventional pressure regulating valve 20 which may be constructed as shown in the patent to Harry M. Valentine U.S. Pat. No. 3,236,256 dated Feb. 22, 1966. Reservoirs 10 and 16 have respective conduits 22, 24 connected with inlet cavities of upper and lower parts 26, 28 of a dual pressure brake valve 30 which may be of the type shown in the patent to George E. Ternent U.S. Pat. No. 3,580,646 dated May 25, 1971. As shown, the lower part 28 is connected through conduits 32, 33 with the front service brakes of a truck or tractor, while the upper part 26 is connected by a conduit 34 to the rear service brakes 35 which include the usual service brake chamber 36, push rod 38 and a tandemly mounted spring brake actuator 40 having a release chamber 42 to and from which fluid pressure is admitted and exhausted by way of a conduit 44 to control the spring brake.

The novel modulating relay valve 46 of the present invention is arranged to control the fluid pressure in the conduit 44 and hence in the release chamber 42 of the spring brake 40 and, as shown, such valve comprises a housing 48 provided with a delivery port 50 to which the conduit 44 is connected. Delivery port 50 communicates with a delivery cavity 52 in the housing 48 and the delivery cavity 52 is connected with an inlet cavity 54 through a central port 56 formed by a valve seat 58 engageable by a combined balanced inlet and exhaust valve 60 to disconnect the inlet and delivery cavities 54, 52. As shown, the valve 60 is also engageable by an exhaust valve element 62 carried by the lower portion of an emergency piston 64 slideably mounted in the housing 48.

As shown, the valve 60 is carried by a tubular member 66 having an exhaust passage 68 formed therein which communicates at its lower end with an exhaust chamber 70, the latter being in constant communication with the atmosphere by way of a conventional check valve seal 72. Thus when the exhaust valve element 62 engages the valve 60, communication between the delivery chamber 52 and the exhaust chamber 70 is interrupted. A valve return spring 73 is interposed between a stationary partition 75 and valve 60 and normally urges the latter upwardly. In the upper portion of the housing 48 a spring 74 is positioned between a cap 76 and the piston 64 and normally maintains the latter in the position shown where the lower surface 78 of the piston 64 engages an abutment 80 formed in the housing. From this construction, it will be readily understood that when the piston 64 occupies the position illustrated with the exhaust valve element 62 engaging the valve 60 so that the latter is moved off the seat 58, communication will be established between the delivery cavity 52 and the inlet cavity 54. In such condition of the valve, fluid pressure may be conducted past the open valve 60 to the spring brake release chamber 42 by way of the inlet cavity 54 and the delivery cavity 52. As shown, the inlet cavity 54 may be supplied with fluid pressure from the reservoirs 10 and 16 by way of conduits 82, 84, one-way check valves 86, 88, conduit 90, parking valve 92, conduit 94 and inlet port 96. Thus when the parking valve 92 is moved to open position, the release chamber 42 of the spring brake actuator is charged with fluid pressure to release the spring brake.

One of the important aspects of the invention resides in limiting the pressure supplied to the release chamber 42 of the spring brake in order to avoid pressure build-up in the chamber above that required to activate the spring brake to released position. This is achieved by the piston 64 and the association thereof with the valve 60. Thus when the parking valve 92 is moved to open position as above described, fluid pressure in the delivery cavity 52 acting upon the lower surface of the piston 64 will move the latter upwardly against the tension of the spring 74 until the valve 60 engages the valve seat 58 in order to prevent any further build-up of pressure within the spring brake release chamber 42. It will be understood that the tension of the spring 74 is such that the required release pressure will be conducted to the chamber 42 before closure of the valve 60. In this manner additional and unnecessary build-up of pressure in the spring brake release chamber is prevented.

From the foregoing, it will be seen that when the parking valve 92 is moved to its exhaust position to connect an exhaust opening 98 of the parking valve with the conduit 94, fluid pressure within the inlet cavity 54 will be exhausted through the opening 98 and the fluid pressure within the delivery cavity 52 acting upon the upper surface of the valve 60 will move the latter to its exhaust position to connect the delivery cavity 52 and hence the spring brake release chamber 42 to the atmosphere by way of port 56, exhaust passage 68 and exhaust chamber 70. The spring brake will thus be fully applied for parking purposes.

It will be understood from the above description that the valve 60 in combination with the piston 64 provides a means for modulating or graduating the release of fluid pressure from the spring brake release cavity 42 in order to allow a graduated application of the spring brake during certain conditions of operation of the dual brake system. Thus, when fluid pressure is supplied to a control chamber 100 to act upon the surface 78 of the piston 64, the latter will be moved upwardly against the action of the spring 74 so that the valve 60 is first closed against the seat 58 in order to interrupt communication between the inlet chamber 54 and the delivery chamber 52. Further increase in pressure within the chamber 100 will move the piston 64 a further distance upwardly in order to separate the exhaust valve element 62 from the valve 60 in order to connect the delivery chamber 52 and hence the spring brake release chamber 42 with the exhaust chamber 70 by way of port 56 and exhaust exhaust passage 68. Reduction of pressure within the release chamber 42 will accordingly enable spring brake application of the actuator 40 to be initiated. In the event the control pressure in the chamber 100 is then maintained at a set value, it will be understood that as the pressure within the delivery chamber is reduced to a predetermined value, the forces acting on the piston 64 will allow the latter to be moved to a lapped position, through the action of the spring 74, so that the exhaust valve element 62 will engage the valve 60 to interrupt any further exhaust of fluid pressure from the spring brake release chamber 42. Thus, an increase of the control pressure within the chamber 100 effects a decrease in fluid pressure in the release chamber 42 thereby modulating the application of the spring brake actuator. In this manner, the spring brake operation is controlled and graduated by inversion of the control signal in the chamber 100.

Novel means are provided by the invention to control the application of fluid pressure to the control chamber 100 and such means are constructed and arranged as to avoid modulated application of the spring brake when the reservoir pressures are at their normal values so that the fluid pressure brake system may be operated in its intended manner. Thus, so long as the reservoir pressure is within a range considered to be a safe operating pressure, no fluid pressure will be conducted to the chamber 100 and hence no spring brake operation will occur. However, when reservoir pressure drops to a value below the safe level, the aforementioned means is effective to control modulated application of the spring brakes to enable braking of the vehicle notwithstanding the fact that available reservoir pressure may be insufficient to secure efficient vehicle braking through operation of the service brake actuators.

As shown, such means includes a control valve 102 within the housing 48 which is effective to control the application of fluid pressure to the chamber 100 from the front brake conduit 32 by way of a conduit 104, modulation control port 106, chamber 108 and passage 110. Valve 102 is constantly urged toward a seat 112 by a spring 114 and when the valve 102 is closed upon said seat, communication between the chamber 100 and the conduit 104 is interrupted. An interlock piston 116 is slideably mounted within a chamber 118 formed in the housing and is normally urged to the position shown by a spring 120. Integrally formed on the piston is a valve actuating member 122 having an upper portion 124 which is adapted to engage the valve 102 to move the latter off the seat 112. When member 122 is moved downwardly a sufficient distance to allow the valve 102 to close and permit portion 124 to be disengaged from the valve 102, the passage 110 is connected with an exhaust chamber 126 through a passage 128 in the member 122. The chamber 118 is constantly supplied with fluid pressure from the primary reservoir 10 by way of a conduit 130 so that with the brake system charged with fluid pressure, the interlock piston 116 is normally moved downwardly to permit the valve 102 to close on the seat 112 and connect the control chamber 100 with the exhaust chamber 126 by way of the passages 110 and 128. Thus in normal operation of the brake system, no spring brake modulating movement of the piston 64 will occur due to the position of the interlock piston 116. However, should the pressure within the reservoir 10 drop below the safe level, as for example of the order of 20–45 psi, the spring 120 will move the piston 116 upwardly to open the valve 102 to connect the control chamber 100 with the front brake control conduit 32 by way of passage 110, chamber 108, port 106 and conduit 104. Thereafter, the modulated release of fluid pressure from the spring brake release chamber 42 in accordance with the control signal derived from the fluid pressure in the conduit 104 and control chamber 100 will occur as above described.

From the above it will be apparent that the inlet and delivery cavities 54 and 52 are normally disconnected and the inlet and exhaust valve is lapped. Under these circumstances, it can be seen that when the parking valve 92 is operated to apply the spring brakes, the latter might not respond due to possible trapping of release pressure in the spring brake release cavity. To prevent this, a check valve 132 serves to by-pass the lapped valve element 60 to ensure that the pressure in the release cavity is relieved through the parking valve at the will of the operator.

From the foregoing, it will be readily appreciated that the invention provides a spring brake modulating valve which enables a controlled application of the spring brakes in a situation where available fluid pressure for normal service brake operation has dropped to a relatively low unsafe level. In addition, the valve includes a limiting feature which avoids the build-up of fluid pressure in the release chambers of the spring brakes beyond that required to release the spring brake. Furthermore, the invention provides a novel interlock system which positively assures that a spring brake application will not occur until the reservoir pressure has dropped to a predetermined and unsafe level.

It will be apparent to those skilled in the art that the invention is susceptable of a variety of modifications without departing from the scope of the invention as defined in the appended claims.

What is claimed is:

1. For use in a fluid pressure braking system of the dual circuit type in which one circuit includes a spring applied fluid pressure released actuator, and a manually operable valve for controlling the application of fluid pressure to said circuits, the invention which comprises a first valve means movable to a first position to supply fluid pressure from a source to said actuator to move the latter to a brake released position and movable to a second position to release fluid pressure from said actuator, to graduate spring brake application thereof in accordance with fluid pressure supplied to said other circuit, and means controlled by fluid pressure from the source for positively preventing fluid pressure release operation of said valve means so long as the fluid pressure from the source is above a predetermined value, said means including a first pressure responsive member for moving said valve means, resilient means for actuating said member to move the valve means to said first position, said member having a motive area, a second valve means movable to a first position for normally connecting said motive area with the atmosphere, and movable to a second position to connect said motive area with the other circuit, and a second pressure responsive member axially aligned with said second valve means and movable in response to fluid pressure from said source to allow the second valve means to occupy its first position, the second pressure responsive member being spring-actuated to positively move the second valve member to its second position.

2. A construction as set forth in claim 1 including a casing and wherein said first and second valve means are mounted in said casing parallel with each other.

3. A construction as set forth in claim 1 wherein said first pressure responsive member and said first valve means are axially aligned.

* * * * *